(12) United States Patent
Huang et al.

(10) Patent No.: US 10,619,262 B1
(45) Date of Patent: Apr. 14, 2020

(54) ELECTRODEPOSITED COPPER FOIL

(71) Applicant: CHANG CHUN PETROCHEMICAL CO., LTD., Taipei (TW)

(72) Inventors: Huei-Fang Huang, Taipei (TW); Yao-Sheng Lai, Taipei (TW); Jui-Chang Chou, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 16/455,011

(22) Filed: Jun. 27, 2019

(51) Int. Cl.
| | |
|---|---|
| B21C 37/00 | (2006.01) |
| C25D 7/06 | (2006.01) |
| C25D 3/38 | (2006.01) |
| C25D 5/16 | (2006.01) |
| H01M 4/66 | (2006.01) |
| H01M 10/0525 | (2010.01) |

(52) U.S. Cl.
CPC ............ *C25D 7/0614* (2013.01); *C25D 3/38* (2013.01); *C25D 5/16* (2013.01); *H01M 4/661* (2013.01); *H01M 10/0525* (2013.01); *Y10T 428/12431* (2015.01); *Y10T 428/12438* (2015.01)

(58) Field of Classification Search
None
See application file for complete search history.

(56) References Cited

U.S. PATENT DOCUMENTS

| | | | |
|---|---|---|---|
| 4,777,078 A * | 10/1988 | Miyabayashi | ............ C23C 2/26 |
| | | | 174/257 |
| 5,863,410 A | 1/1999 | Yates et al. | |
| 2008/0174016 A1* | 7/2008 | Sato | ...................... H05K 1/0346 |
| | | | 257/741 |

FOREIGN PATENT DOCUMENTS

| | | |
|---|---|---|
| CN | 107113971 A | 8/2017 |
| JP | 3850155 B2 | 6/2000 |
| JP | 2001152267 A | 6/2001 |
| JP | 3850321 B2 | 10/2002 |
| JP | 201037585 A | 2/2010 |
| WO | 2016035604 A1 | 3/2016 |
| WO | WO2016035604 * | 3/2016 ............... C25D 5/16 |

* cited by examiner

*Primary Examiner* — Seth Dumbris
(74) *Attorney, Agent, or Firm* — Nixon Peabody LLP; Thomas P. Pavelko

(57) ABSTRACT

Electrodeposited copper foils having properties suitable for use as current collectors in lithium-ion secondary batteries are disclosed. The electrodeposited copper foils include a drum side and a deposited side. At least one of the deposited side or the drum side has a root mean square slope (RΔq) in the range of about 0.03 to about 0.23. In this manner, the copper foil has good durability and workability, as well as good performance as current collectors in lithium-ion secondary batteries.

18 Claims, 3 Drawing Sheets

ELECTRODEPOSITED COPPER FOIL

FIELD OF THE INVENTION

The present disclosure relates to electrodeposited copper foils having high durability and workability. The disclosure also relates to lithium ion secondary batteries made using said electrodeposited copper foils.

BACKGROUND

Lithium-ion secondary batteries have a combination of high energy and high power density, making it the technology of choice for portable electronic devices, power tools, electric vehicles ("EVs"), energy storage systems ("ESS"), cell phones, tablets, space applications, military applications, and railways. Electric vehicles (EVs), include hybrid electric vehicles ("HEVs"), plug-in hybrid electric vehicles ("PHEVs"), and pure battery electric vehicles ("BEVs"). If electric vehicles (EVs) replace the majority of fossil fuel (e.g., gasoline, diesel fuel, etc.) powered transportation, lithium-ion secondary batteries will significantly reduce greenhouse gas emissions. The high energy efficiency of lithium-ion secondary batteries may also allow their use in various electric grid applications, including improving the quality of energy harvested from wind, solar, geo-thermal and other renewable sources, thus contributing to their more widespread use in building an energy-sustainable economy.

Therefore, lithium-ion secondary batteries are of intense interest for commercial ventures as well as in basic research in government and academic laboratories. Although research and development in this field has abounded in recent years and lithium-ion secondary batteries are currently in use, there remains a need for improvements with respect to higher capacity, higher current generation, and batteries that can undergo more charge/discharge cycles thereby extending their useful life. Additionally, improvements in the weight of the batteries are needed to improve applications in several environments, such as vehicle, portable electronics and space applications.

Secondary lithium-ion batteries typically include a current collector of a metal foil on which is deposited an active material. Copper foils are often used as the current collector because copper is a good conductor of electrical current. As demands for lower weight batteries become ever more urgent, the current collector needs to be thinner to reduce the size and weight of lithium-ion secondary battery. Additionally, to increase the capacity of the lithium-ion secondary battery, materials such as silicon (Si), germanium (Ge), and tin (Sn) are mixed with or fill the higher capacity active material in a battery, exacerbating the expansion and contraction of the active material and stresses on the copper foil it is in contact with. Furthermore, in some recent advancements, in order to increase the capacity of the batteries, the copper foils, worked as electrodes, are folded or bent and wound. If the copper foil cannot withstand the expansion and contraction of the active material during battery use, or cannot withstand folding and winding during production of the battery, the cycle characteristics of the battery are adversely affected.

There therefore remains a need for improved copper foils for use in lithium-ion secondary batteries. There is therefore a need for thinner copper foils having improved workability and durability and that, when combined with the active materials to provide lithium-ion secondary batteries, do not fail under high cycles of charge and discharge due to separation between the copper foil and the active materials, or fail due to the copper foil fracturing. All the while these needed thinner copper foils, fulfilling the goals of reducing the weight and increasing the capacity of lithium-ion secondary batteries, must not fail during either the production of the battery, or in use of the battery.

SUMMARY

In general, the inventions described herein relate to a copper foil such as electrodeposited copper foils that can be used as a current collector in lithium-ion secondary batteries. Copper foils have been prepared having excellent properties improving the workability and durability. The copper foils have controlled surface properties such as a controlled surface roughness, which when made into batteries, have extended cycle life. In addition, improvements have been found by controlling the hydrogen content in the copper foils.

In a first aspect, the invention comprises an electrodeposited copper foil comprising a drum side and a deposited side, wherein at least one of the deposited side and the drum side has a surface roughness characterized by a root mean square slope (R$\Delta$q) in the range of about 0.03 to about 0.23, or an R$\Delta$q in a range of about 0.03 to about 0.19. Optionally, each of the deposited side and the drum side of the electrodeposited copper foil has an R$\Delta$q in the range of about 0.03 to about 0.23. Optionally, the hydrogen content of the electrodeposited copper foil is less than about 50 ppm. Optionally the hydrogen content is in the range of about 10 ppm to about 47 ppm. Optionally the hydrogen content is in the range of about 10 ppm to about 40 ppm. Optionally the electrodeposited copper foil is an electrodeposited copper foil further comprising a tarnish resistant layer formed on its exterior so as to have a tarnish resistant formed exterior. For example, wherein the tarnish resistant layer is one metal selected from the group consisting of zinc, chromium, nickel, cobalt, molybdenum, vanadium, their alloys and combinations thereof; or an organic tarnish resistant layer.

Some properties according to the first aspect of the invention include the following. Optionally, the electrodeposited copper foil has a fatigue life/thickness in the range of about 10 $\mu m^{-1}$ to about 36 $\mu m^{-1}$. Optionally, the electrodeposited copper foil has a tensile strength in a range of about 25 to 75 kg/mm$^2$. Optionally, the electrodeposited copper foil has an elongation in a range of about 2 to 35%. Optionally the electrodeposited copper foil has a thickness in the range of about 2 $\mu$m to about 25 $\mu$m.

In a second aspect, the invention comprises a current collector for a lithium-ion secondary battery comprising the electrodeposited copper foil, for example, as describe in the first aspect of the invention.

In a third aspect, the invention comprises a lithium-ion battery comprising the current collector, for example, as describe in the second aspect of the invention. Optionally, each of the deposited side and the drum side of the electrodeposited copper foil has a root mean square slopes (R$\Delta$q) in the range of about 0.03 to about 0.23.

The electrodeposited copper foil as described herein show excellent properties when used in lithium-ion secondary batteries. In addition to allowing the fabrication of light secondary batteries with high capacity, batteries made with these electrodeposited copper foils have excellent charge/discharge cycling properties. For example, the copper foils and the active materials do not separate or fracture during high amounts of charge/discharge cycling for the lithium-ion secondary battery. Without being bound to a specific mechanism it is suggested that at least part of these improvements are due to the excellent adhesion between the copper foil and the active material, as well as having reduced number of breaking/failure points in the copper foil.

The above summary is not intended to represent every embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings.

Figure 1:
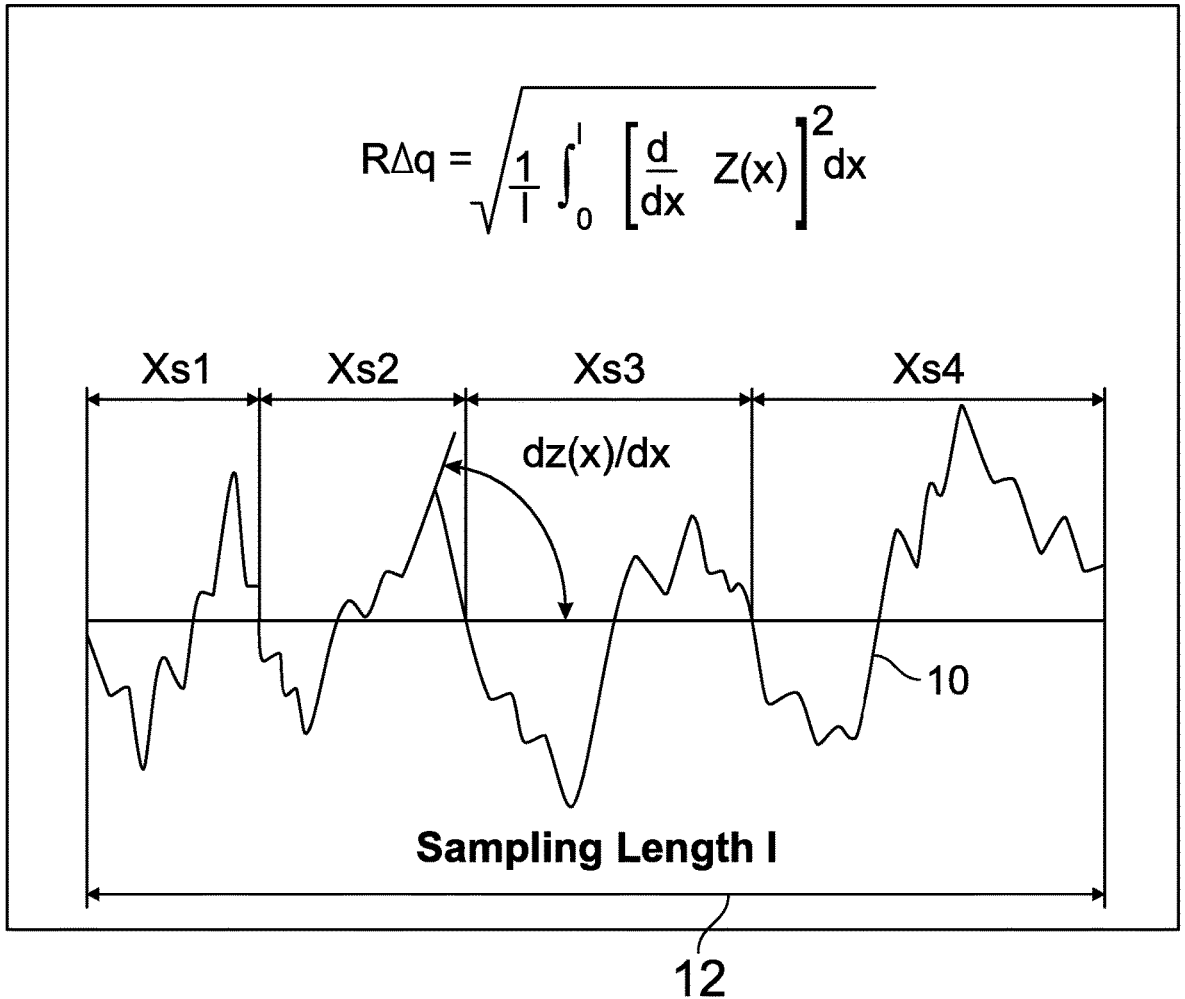
FIG. 1 is a graph showing the root mean squared slope parameter (RΔq).

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

It should be expressly understood that all the graphics and other representations of the drawings are schematic only. The same numbers are used to represent similar elements in various figures of the drawings to facilitate understanding of the disclosed embodiments.

DETAILED DESCRIPTION

Articles of manufacture herein relate to electrodeposited copper foils that have quantifiable characteristics and which provide good performance when used as current collectors. For example, these electrodeposited copper foils can be combined with active materials to provide anodes for lithium-ion secondary batteries. The embodiments of the electrodeposited copper foils have a surface roughness in a specified range where RΔq is between about 0.03 and 0.23. Some embodiments of the electrodeposited copper foils have hydrogen content less than about 50 ppm. By using the embodiments of the electrodeposited copper foils as described herein, lithium-ion secondary batteries, with improved performance, such as high amounts of charge/discharge cycles, can be constructed.

The electrodeposited copper foil has surface texture or features that affect its properties and final performance when incorporated into a battery. One such feature is the surface roughness which can be quantified by the "root mean square slope" (RΔq). FIG. 1 shows a plot of surface topography 10, represented by vertical position function $Z(x)$. RΔq indicates the root mean square of the local tilt $dZ/dX$ along the sampling length (l) 12. A high RΔq indicates a higher slope to surface undulation, while a lower RΔq indicates a lower slope to surface undulation.

The electrodeposited copper foil also has possible variations that affect its properties and also its performance when the copper foil is incorporated into a battery. The amount of hydrogen in the copper foil can affect the crystallization of copper and physical properties of the electrodeposited copper foil. Therefore, in some embodiments the hydrogen content of the electrodeposited copper foil is controlled. When the hydrogen content of the copper foil is higher than 50 ppm, wrinkles and cracks can more easily form on the copper foils during charge and discharge than when the hydrogen content is less than about 50 ppm. Therefore, in some embodiments the hydrogen content is suppressed or kept low, such as lower than about 50 ppm (e.g., between about 10 ppm to about 47 ppm or between about 10 ppm and about 40 ppm). This improves the workability and durability of the electrodeposited copper foil.

As used herein the "drum side" of the copper foil is the surface of the copper foil that is in contact with a drum used during the electrodeposition, while the "deposited side" is the opposite side, or the surface of the electrodeposited copper foil that is in contact with an electrolyte solution during the electrodeposition forming the copper foil. These terms relate to a manufacturing process for producing electrodeposited copper foils which include partially immersing a rotating drum assembly into an electrolyte solution containing copper ions. Therefore, under operation of an electric current, copper ions are drawn to the drum and reduced, resulting in copper metal plating onto the surface of the drum forming an electrodeposited copper foil on the surface of the drum. This copper foil so formed is removed from the drum in a continuous process by rotating the drum and removing the copper foil as the formed copper foil rotates with the drum out of the electrolyte solution. For example, the copper foil can be pulled off the drum as it is formed by, and passed over or through rollers in a continuous process.

As noted, in some embodiments, the surface roughness, RΔq, of the electrodeposited copper foil, for example on a side that is ultimately contacted with an active material in a battery, is chosen to be between about 0.03 and 0.23. Without being bound to a specific theory, the surface roughness, as represented by RΔq of the electrodeposited copper foil, can affect the electrodeposited copper foil in the following manner. When RΔq is high, for example higher than about 0.23, the number of potential breaking or fracturing points can increase in the copper foil. This results in a more fragile copper foil that can break more easily than an electrodeposited copper foil with RΔq less than about 0.23. In addition, a higher RΔq correlates with steeper valleys and indentations on the surface of the electrodeposited copper foil, so that the space of the valleys may become narrower. Consequently, with an RΔq of greater than about 0.23, the active material, which can be applied as a viscose slurry or paste to the surface of the electrodeposited copper foil in forming an electrode, does not penetrate deeply into the valleys of the copper foil. That is, a higher RΔq correlates with steeper valleys and the high surface tension of the depositing active material prevents the active material reaching to the bottom of the valleys and reduces the active materials overall intimate contact with the surface of the copper foil. This reduces the adherence of the active material to the surface. Conversely, where the copper foil is smoother, for example where RΔq of the electrodeposited copper foil is less than about 0.23, the amount of potential break points decreases. The coating can also be more efficient or uniform in that more contact between the active material and the electrodeposited copper foil occurs. However, with too low surface roughness, such as where RΔq is less than 0.03, the adhesion between the active material and the surface decreases and detachment, separation, and delamination of the active material from the electrodeposited copper foil can occur. A possible effect of too high (RΔq>0.23) or too low (RΔq<0.03) surface roughness is therefore that the workability, ductility and durability of the electrodeposited copper foil and electrode formed therefrom is inferior.

In some embodiments, RΔq of the electrodeposited copper foil can be controlled by the surface parameters of the drum. For example, the grain size, the grain size distribution, and number of grain boundaries at the drum surface can in some embodiments be used to modulate the RΔq. Drums can readily be made having controlled grain size, grain size distributions and densities of grains, and therefore, this allows the control of the RΔq on the drum side of the electrodeposited copper foil. The grain density can be quantified by the "grain size number" where a higher number corresponds to a higher grain density while a lower number corresponds to a lower grain density. The grain size number can be determined by using standard test method JIS G0552. In some embodiments, RΔq of the electrodeposited copper foil can be controlled by the composition of the electrolyte used during the deposition process. Without limitation, some of the electrolyte components that can affect RΔq include sulfuric acid, chloride ion, accelerator, suppressor, and combinations of these.

Figure 2:
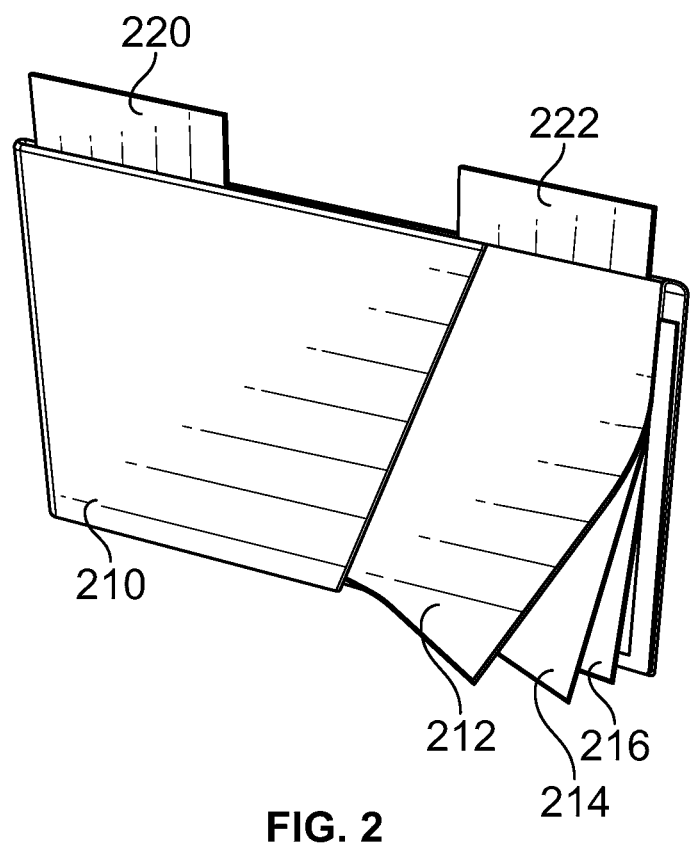
FIG. 2 is a perspective view illustrating components of a laminated type lithium-ion battery.

FIG. 2 shows the unassembled components of a laminated type lithium-ion battery that can incorporate the electrodeposited copper foil as described in the embodiments. Laminated type lithium-ion secondary batteries can be made by providing an anode slurry composed of active material, conductive additive, binder, and solvent, and then mixing the slurry and coating it on the surface of the electrodeposited copper foil described herein. The coating can be a continuous or an intermittent coating, depending on processing demands. The slurry coated electrodeposited copper foil is subsequently heated (e.g., 160° C.) in an oven. From the oven, the copper foil is pressed between opposed rollers and then finally cut into sheets which can be used to make a laminated battery. In this laminated battery, the copper foil is made into a current collector of the anode. The battery includes a pouch 210 that holds the components of the battery. The anode 212 includes an electrodeposited copper foil in contact with an active material on both the drum side and the deposition side of the copper foil. The battery also includes a separator 214 and a cathode 216. The battery is constructed in a stacked fashion as shown, with the anode 212 contacting the separator 214 on one side of the separator, and the cathode 216 contacting the separator 214 on an opposite side thereof. The laminate comprising the anode 212, separator 214 and cathode 216 is contained within the pouch 210. The anode 212 is provided with an anode tab 220 that serves as a terminal for the secondary battery. The cathode 216 is provided with a cathode tab 222 that serves as another terminal for the secondary battery.

Figure 3:
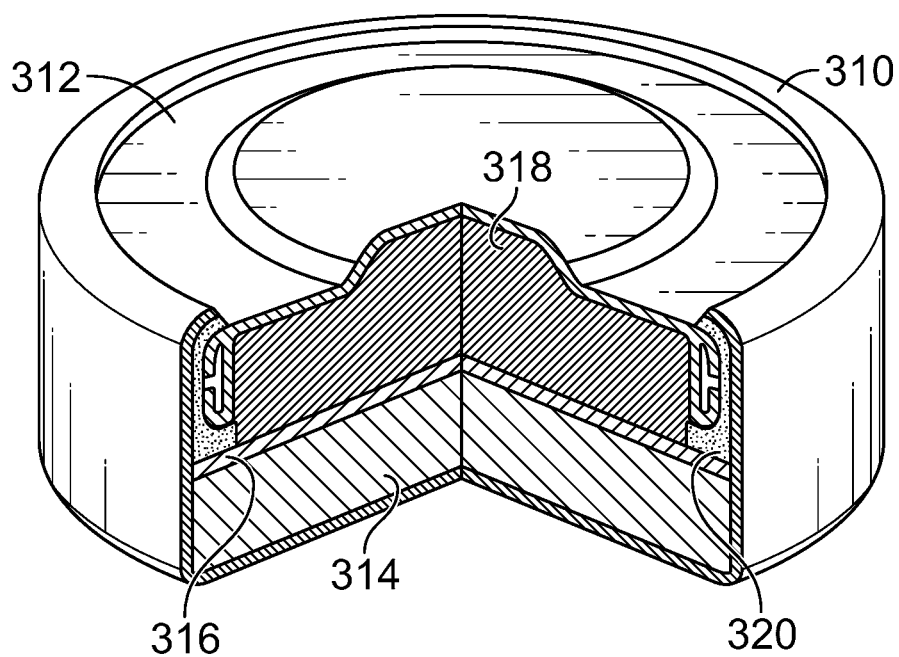
FIG. 3 is a perspective view with a cut out illustrating the components in a coin type lithium-ion secondary battery.

FIG. 3 shows unassembled components with a partial cutout to illustrate a coin type lithium-ion secondary battery. The battery includes a cylindrical cell can 310 that contains additional components of the battery. The top of the cylindrical cell can 310 is open and capped with an anode cap 312. A cylindrical cathode 314 is placed in the cylindrical cell can 310. A separator 316 is placed over the cathode 314. Anode 318 is placed over the separator 316. The anode cap 312 is compressed against a gasket 320 which compresses against the cathode 314, ensuring electrical isolation of the cathode 314 and anode 318. In this coin type lithium-ion secondary battery, the copper foil is made into a current collector of the cathode 314.

Therefore, in some embodiments the electrode made using the copper foil can be formed as a cathode, and the active material coated thereon is a cathode material. In some other embodiments, the electrode made using the copper foil can be formed as an anode, and the active material coated thereon is an anode material.

As used herein the "tensile strength" of a material is the maximum amount of tensile stress that it can be subjected to before failure. As used herein the "elongation" of a material refers to the maximum amount of elongation that a material can be subjected to before failure. Preferably, the electrodeposited copper foil has a tensile strength in a range of about 25 to 75 kg/mm². Preferably, the electrodeposited copper foil has an elongation in a range of about 2 to 35%. A standard test method that can be used for measuring both the tensile strength and elongation is documented in Standard Test Method IPC-TM-650 2.4.18. For example, testing can be done using a universal testing machine such as is available from Model AG-I testing machine manufactured by Shimadzu Corporation.

As used herein "anti-tarnish coating" is a coating applied to a metal that can protect the coated metal from degradation such as due to corrosion. In some embodiments the electrodeposited copper foil includes an anti-tarnish coating formed on its surfaces so that it has an anti-tarnish formed exterior. This can be made by any known method and includes dipping or passing the formed electrodeposited sheet through a solution containing anti-tarnish forming additives, or electroplating a metal or alloy film on the formed electrodeposited sheet. For example, a bath including any one or more of zinc, chromium, nickel, cobalt, molybdenum, vanadium and combinations thereof; or an organic compound that forms an anti-tarnish resistant layer. The processing can be continuous and part of the overall process in preparing the electrodeposited copper foil.

Charge-discharge testing refers to testing where a potential is applied across the anode and cathode of a battery so as to charge the battery, and then connecting the cathode and anode across a load and allowing the current to pass through the load to discharge the battery. This charge and discharge represents one charge-discharge cycle. The testing can be done to simulate how well a battery performs with respect to repeated use. The "cycle-life" or "charge-discharge cycle life" is defined as the number of charge-discharge cycles a battery can perform before its nominal capacity falls below 80% of its initial rated capacity.

It should be understood within the scope of the present disclosure, the above-mentioned technical features and technical features mentioned below (such as examples) can be combined freely and mutually to form new or preferred technical solutions, which are omitted for brevity.

EXAMPLES

1. Electrodeposited Copper Foil Preparation

Figure 4:
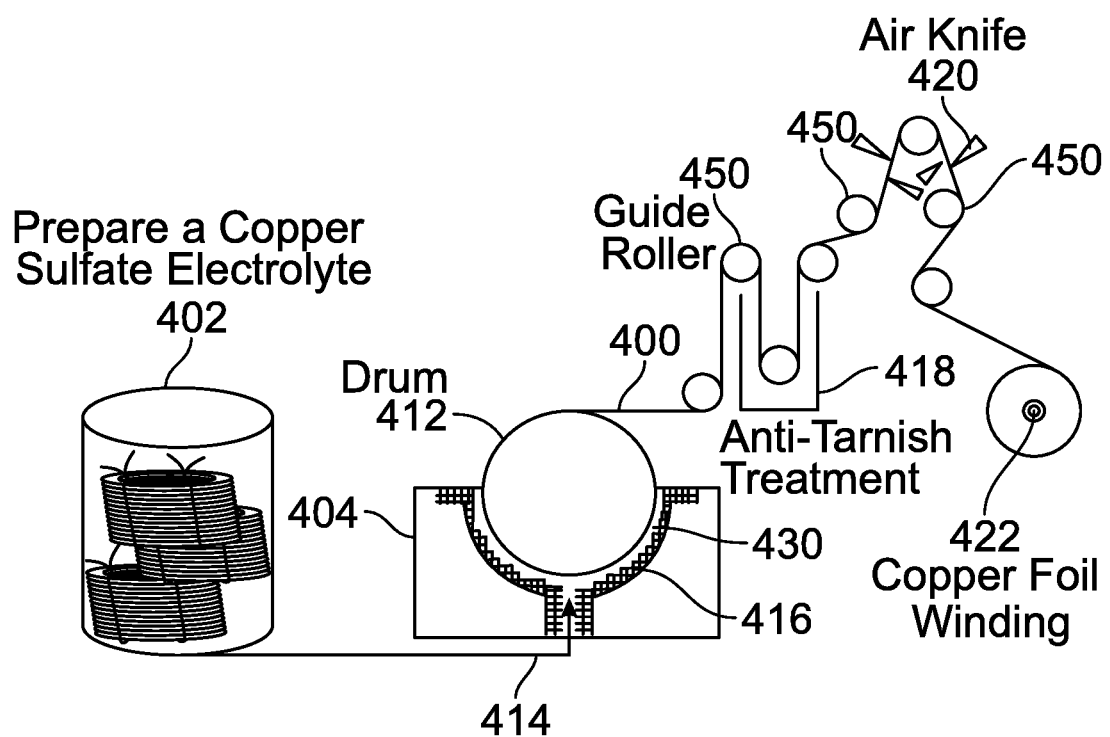
FIG. 4 shows a process for preparing a copper foil.

An electrodeposited copper foil was prepared by the processes depicted in FIG. 4 showing the formation of copper foil 400 from an electrolyte supplied by an electrolyte source 402 using the drum assembly 404. The electrodeposited copper foil 400 was electrodeposited on a rotating drum 412, partially immersed in an electrolyte 430, that is provided through a fluid connection 414 from the electrolyte source 402. Under the influence of an electric current between the anode 416 and the drum 412, where the drum 412 acted as a cathode, the copper ions contained in the electrolyte 430 are reduced and deposited on the surface of the rotating drum 412. The copper foil is removed from the drum 412 and fed through guide rollers 450. The resulting copper foil 400 was further processed through an anti-tarnish applicator 418, thinned via an air knife 420 and was collected on a copper foil winding spool 422. Drums 412 were selected having a grain size number (JIS G 0551-2013) between 7 and 9 for the experiments, and also included some drums having grain size numbers below 7 and above 9 for some of the control experiments.

The electrolyte was made by dissolving copper wire in an aqueous solution of sulfuric acid (50 wt %) to prepare the copper sulfate electrolyte solution which contained 280 g/L of copper sulfate ($CuSO_4.5H_2O$). The final sulfuric acid was controlled to several values to make several test solutions in the range of 40-60 g/L of sulfuric acid. Some control test solutions with less than 40 g/L sulfuric acid and higher than 60 g/L of sulfuric acid were also used. Hydrochloric acid (RCI Labscan Ltd) was added to provide a chloride ion concentration in the range of 15-25 mg/L for several electrolyte test solutions. Some control test solution with less than 15 mg/L of chloride ion and more than 25 mg/L chloride ion were also prepared. Additional components include 3.7 mg/L of chitosan (Chitosan, MW=5000, Sigma-Aldrich, MO) as suppressor and 2.1 mg/L of 3,3'-Thiobis-1-propanesulfonic acid, disodium salt (TBPS, Sigma-Aldrich, MO) as accelerant.

The depositing conditions of the liquid temperature of the copper sulfate electrolyte was about 43° C., and the current density was about 55 $A/dm^2$.

As noted above, after the copper foil was produced, the surface of copper foil was treated with an anti-corrosion material, in a continuous fashion by guide rollers passing the copper foil through the anti-tarnish applicator 418 containing an anti-tarnish plating bath. The anti-tarnish plating bath contained 1.5 g of $CrO_3$ per liter (obtained from Sigma-Aldrich), at 25° C. and the current density was about 0.5 $A/dm^2$. The plating time is 2 seconds.

2. Laminated Lithium-Ion Secondary Battery

Laminated type lithium-ion secondary batteries were prepared as follows and subjected to high c-rate charging/discharging testing. The copper foil is used as the current collector of anode.

A cathode slurry and an anode slurry were made using N-methyl-2-pyrrolidone (NMP) as solvent. The cathode slurry was formulated to have a liquid to solid ratio of 195 wt % (195 g of NMP:100 g of the cathode material). The anode slurry was made to have a liquid to solid ratio of 60 wt % (60 g of NMP:100 g of the anode material). Cathode material and Anode material ingredients are shown in Table 1.

TABLE 1

Cathode and Anode Formulations

| Cathode material formulation: Based on the total weight of the cathode material | |
|---|---|
| Cathode active substance ($LiCoO_2$) | 89 wt % |
| Conductive additive (Flaked graphite; KS6) | 5 wt % |
| Conductive additive (Conductive carbon powder; Super P ®) | 1 wt % |
| Solvent-Based Binder (PVDF 1300) | 5 wt % |

TABLE 1-continued

Cathode and Anode Formulations

| Anode material formulation: Based on the total weight of the anode material | |
|---|---|
| Anode active substance: Mesophase Graphite Powder (MGPA) | 93.9 wt % |
| Conductive additive (Conductive carbon powder; Super P ®) | 1 wt % |
| Solvent-Based Binder (PVDF6020) | 5 wt % |
| Oxalic acid | 0.10 wt % |

The cathode slurry was coated on aluminum foil, and the anode slurry was coated on the copper foil. After the solvent evaporated, the anode and cathode were pressed and cut into the desired dimensions. The cathodes and anodes are alternately stacked with a separator (Celgard Company) sandwiched there between, and placed in a container molded by laminate film. The container was filled with an electrolyte (LBC322-01H, manufactured by Shenzhen Capchem Technology Co., Ltd.), and sealed to form a battery. The size of the laminated type battery was 41 mm×34 mm×53 mm.

For high c-rate charging and discharging testing, the charging mode was a constant current-constant voltage (CCCV) mode, where the charging voltage was 4.2V, and the charging current was 5 C. Where the "C" is the C-Rate and refers to the rate at which a battery is charged or discharged relative to its maximum capacity. The discharging mode was the constant current (CC) mode, the discharging voltage was 2.8 V, and the discharging current was 5 C. The charging-discharging test on the batteries was conducted at high temperature (at 55° C.).

Table 2 shows a designed experiment exemplifying embodiments with two surfaces, deposition side and drum side, of an electrodeposited copper foil coated with an active material. The design explores the effects of control variable on properties of an electrodeposited copper foil, and on the properties of charge discharge on a laminated type battery. The table shows in columns from left to right controlled parameters of Grain size number of the Titanium drum surface, the sulfuric acid concentration (g/L), chloride concentration (ppm), Area weight (g/m²), and thickness (μm). The resultant properties or features of the electrodeposited copper foil are also shown in the columns, continuing from left to right: RΔq on the deposited side, RΔq on the drum side, and the hydrogen concentration (ppm). Test results on the laminated lithium-ion type battery are listed in the last two columns: Fatigue Life (cycle), the quotient of Fatigue Life/thickness ($\mu m^{-1}$), and a charge discharge cycle test results (cycle). The range for each of the parameters and resultant properties for the embodiments are listed in the second row. The following rows list nine experimental runs (E.1 through E.9) and six control experiments (C.1 through C.6). The data shows that when RΔq is in the range between 0.03-0.23 for at least one of the drum side or deposition side of the electrodeposited copper foil, the properties of laminated lithium-ion batteries made with the copper foil are better than when RΔq falls out of this range. The data also shows that when the hydrogen content is less than about 50 ppm the properties of a laminated lithium-ion batteries made with the copper foil are better than when the hydrogen content is >50 ppm. Some additional guidance is shown by bolded numbers in the controlled parameters, which indicate the ranges used in the experiments for these parameters. It is clear that the control parameters exhibit some synergies and careful combinations of these are chosen to arrive at the embodiments of the electrodeposited copper foils.

TABLE 2

Designed Experiment Exemplifting Embodiments with two surfaces of an electrodeposited copper foil coated with an active material.

| | Grain size # of Ti drum surf. | Sulf. Acid conc. (g/L) | Cl in ppm | Area wt. in g/m² | Thick (μm) | Tensile strength (kg/mm²) | Elongation (%) | RΔq Dep side | RΔq Drum side | H conc. in ppm | Fatigue Life (cycle) | Fatgiue Life in cycle/Thick (um⁻¹) | Charge-discharge cycle test (cycle-life) |
|---|---|---|---|---|---|---|---|---|---|---|---|---|---|
| E.1 | 7.5 | 50 | 20 | 53.5 | 6 | 33.5 | 10.9 | 0.16 | 0.17 | 26 | 123 | 20 | 1324 |
| E.2 | 7 | 50 | 20 | 53.5 | 6 | 33.6 | 10.2 | 0.21 | 0.23 | 39 | 95 | 16 | 1091 |
| E.3 | 9 | 50 | 20 | 53.5 | 6 | 33.7 | 11.8 | 0.06 | 0.03 | 10 | 216 | 36 | 1752 |
| E.4 | 7.5 | 60 | 20 | 53.5 | 6 | 29.4 | 15.4 | 0.09 | 0.12 | 41 | 86 | 14 | 1016 |
| E.5 | 7.5 | 40 | 20 | 53.5 | 6 | 74.8 | 2.3 | 0.19 | 0.19 | 16 | 194 | 32 | 1658 |
| E.6 | 7.5 | 50 | 15 | 53.5 | 6 | 43.4 | 5.7 | 0.19 | 0.19 | 47 | 61 | 10 | 808 |
| E.7 | 7.5 | 50 | 25 | 53.5 | 6 | 30.2 | 15.6 | 0.08 | 0.14 | 19 | 168 | 28 | 1532 |
| E.8 | 7.5 | 50 | 20 | 25.4 | 2.9 | 35.2 | 2.0 | 0.17 | 0.16 | 20 | 84 | 29 | 1549 |
| E.9 | 7.5 | 50 | 20 | 187.1 | 21 | 35.2 | 34.9 | 0.19 | 0.15 | 17 | 578 | 28 | 1557 |
| E.10 | 7.5 | 60 | 15 | 53.5 | 6.0 | 35.1 | 6.8 | 0.11 | 0.10 | 50 | 67 | 11 | 1004 |
| E.11 | 9 | 40 | 20 | 53.5 | 6.0 | 74.9 | 4.5 | 0.20 | 0.04 | 12 | 219 | 36 | 1690 |
| C.1 | 6 | 50 | 20 | 53.5 | 6 | 33.5 | 10.4 | 0.32 | 0.27 | 107 | 14 | 2 | 408 |
| C.2 | 10 | 50 | 20 | 53.5 | 6 | 33.7 | 11.9 | 0.37 | 0.36 | 0.5 | 16 | 3 | 487 |
| C.3 | 7.5 | 70 | 20 | 53.5 | 6 | 29.1 | 14.3 | 0.01 | 0.05 | 86 | 29 | 5 | 521 |
| C.4 | 7.5 | 30 | 20 | 53.5 | 6 | 79.4 | 1.5 | 0.28 | 0.23 | 54 | 51 | 8 | 723 |
| C.5 | 7.5 | 50 | 10 | 53.5 | 6 | 48.8 | 5.0 | 0.31 | 0.24 | 77 | 35 | 6 | 589 |
| C.6 | 7.5 | 50 | 35 | 53.5 | 6 | 30.9 | 10.8 | 0.27 | 0.22 | 69 | 42 | 7 | 642 |

Coin Type Lithium-Ion Secondary Battery

A coin type lithium-ion secondary battery was prepared as follows and subjected to a high c-rate charging and discharging testing. The copper foil is used as the current collector of cathode.

A cathode slurry was made using N-methyl-2-pyrrolidone (NMP) as solvent. A cathode slurry was made to have a liquid to solid ratio of 60 wt % (60 g of NMP:100 g of cathode material). Cathode material ingredients are shown in Table 3.

TABLE 3

Cathode Formulation

Cathode material formulation: Based on the total weight of the anode material

| | |
|---|---|
| Cathode active substance (MGPA) | 93.9 wt % |
| Conductive additive (Conductive carbon powder; Super P ®) | 1 wt % |
| Solvent-Based Binder (PVDF6020) | 5 wt % |
| Oxalic acid | 0.10 wt % |

The cathode slurry was coated on the electrodeposited copper foil, and after the solvent evaporated, the cathode was pressed and punched into appropriate sizes to make the batteries. Subsequent to this, cathode and anode (lithium metal) were stacked with a separator (Celgard Company) sandwiched there between, and placed in the cylindrical cell can or container portion of a coin cell. The container was filled with an electrolyte (LBC322-01H, manufactured by Shenzhen Capchem Technology Co., Ltd.), and sealed to form a battery. The coin type battery was 20 mm in diameter and 3.0 mm in height.

For charging-discharging testing, the charging mode was the constant current-constant voltage (CCCV) mode, where the charging voltage was 1.8V, and the charging current was 1 C. The discharging mode was the constant current (CC) mode, the discharging voltage was 0.01 V, and the discharging current was 1 C. The charging-discharging test on the batteries was conducted at 45° C.

Table 4 lists data from two experiments using a coin type lithium-ion secondary battery. The data lists the same test parameters and effects as in Table 2 but includes in the last column a charge discharge cycle test of a. the deposited side and b. the drum side. The test shows that when either the deposited side or the drum side is coated with an active material where the surface has RΔq between about 0.03 and about 0.23, the charge discharge cycle test is improved for that tested side. For example, where in experiment 12 (E.12) on the drum side RΔq is 0.22, the charge/discharge cycle test on the drum side is 325 cycles, while in E.12 where RΔq is 0.27 on the deposited side the charge/discharge cycle test on the deposited side is only 119 cycles.

TABLE 4

Designed Experiment Exemplifying Embodiments with one surface of an electrodeposited copper foil coated with an active material.

| | Grain size # of Ti drum surf. | Sulf. Acid conc. (g/L) | Cl in ppm | Area wt. in g/m² | Thick (μm) | Tensile strength (kg/mm²) | Elongation (%) | RΔq Dep side | RΔq Drum side | H conc. in ppm | Fatigue Life (cycle) | Fatgiue Life in cycle/Thick (um⁻¹) | Charge-discharge cycle test (cycle-life): a. Deposit side b. Drum side |
|---|---|---|---|---|---|---|---|---|---|---|---|---|---|
| E.11 | 7.5 | 50 | 25 | 53.5 | 6 | 30.2 | 15.6 | 0.08 | 0.14 | 19 | 168 | 28 | a. 315 b. 341 |

TABLE 4-continued

Designed Experiment Exemplifying Embodiments with one surface of
an electrodeposited copper foil coated with an active material.

| Grain size # of Ti drum surf. | Sulf. Acid conc. (g/L) | Cl in ppm | Area wt. in g/m² | Thick (μm) | Tensile strength (kg/mm²) | Elongation (%) | RΔq Dep side | RΔq Drum side | H conc. in ppm | Fatigue Life (cycle) | Fatgiue Life in cycle/ Thick (um⁻¹) | Charge-discharge cycle test (cycle-life): a.Deposit side b. Drun side |
|---|---|---|---|---|---|---|---|---|---|---|---|---|
| E.12 7.5 | 50 | 35 | 53.5 | 6 | 30.9 | 10.8 | 0.27 | 0.22 | 69 | 42 | 7 | a. 119 b. 325 |

4. Test Methods

Area Weight and Thickness

The area weight is a weight per unit area. Test specimens having 100 mm×100 mm were used to determine the area. The weight was determined by a micro balance (AG-204, Mettler Toledo International Inc.), and the area weight is calculated through dividing the weight with area.

Thickness is calculated from the following formula:

Thickness=M/(Aρ): where the thickness is in micro meters (μm), M is the weight of the sample in grams (g), A is the area of the sample in square meters (m²), and ρ is the sample density. The density used for the electrodeposited copper foil used is 8.909 g/cm³.

Root Mean Square Slope (RΔq)

The RΔq was tested using standard test method JIS B 0601-2001. The surface cross section profile was measured using an SE 500 series Surface Roughness Measurement Instrument (Kosaka Laboratory Ltd). The test specimens were 100 mm×100 mm samples from the electrodeposited copper foils. Test conditions were as follows: Radius of stylus tip=2 μm, angle of stylus tip=90°, scan speed=0.5 mm/s, cut off (λc)=0.8 mm, and evaluation length=4 mm.

Hydrogen Content

The hydrogen content was measured using an Oxygen/Nitrogen/Hydrogen Analyzer (EMGA-930, Horiba Ltd.) with a non-dispersive infrared detector (NDIR).

Fatigue Life (Nf, Cycles)

Fatigue life was tested using Standard Test Method IPC-TM-650 2.4.2.1. Briefly the method includes attaching a test specimen which is in the form of a thin strip (e.g., of the electrodeposited copper foil) to a holder that is hanged with a weight, and then the center of the test specimen is rapidly vibrated up and down by using a mandrel with a set diameter. Tests were done using a Model 3FDF Fatigue Ductility Tester (Jovil Universal Manufacturing Company). The test specimens were 12.7 mm×200 mm strips of the electrodeposited copper foil. The test conditions were as follows: diameter of mandrel=0.8 mm, vibration speed=100 vibrations/min, weight for providing tension=84.6 g. For testing, the specimen was attached to the sample holder with adhesive tape so that the sample did not slip from the sample holder. In addition, for the sampling direction, each specimen was cut so that its longer dimension (200 mm) was parallel to the machine direction.

As used herein the term "comprising" or "comprises" is used in reference to compositions, methods, and respective component(s) thereof, that are essential to the claimed invention, yet open to the inclusion of unspecified elements, whether essential or not.

As used herein the term "consisting essentially of" refers to those elements required for a given embodiment. The term permits the presence of elements that do not materially affect the basic and novel or functional characteristic(s) of that embodiment of the claimed invention.

The term "consisting of" refers to compositions, methods, and respective components thereof as described herein, which are exclusive of any element not recited in that description of the embodiment.

As used in this specification and the appended claims, the singular forms "a," "an," and "the" include plural references unless the context clearly dictates otherwise. Thus for example, references to "the method" includes one or more methods, and/or steps of the type described herein and/or which will become apparent to those persons skilled in the art upon reading this disclosure and so forth. Similarly, the word "or" is intended to include "and" unless the context clearly indicates otherwise.

Other than in the operating examples, or where otherwise indicated, all numbers expressing quantities of ingredients or reaction conditions used herein should be understood as modified in all instances by the term "about." The term "about" when may mean±5% (e.g., ±4%, ±3%, ±2%, ±1%) of the value being referred to.

Where a range of values is provided, each numerical value between and including the upper and lower limits of the range is contemplated as disclosed herein. It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

Unless otherwise defined herein, scientific and technical terms used in connection with the present application shall have the meanings that are commonly understood by those of ordinary skill in the art. Further, unless otherwise required by context, singular terms shall include pluralities and plural terms shall include the singular.

It should be understood that this invention is not limited to the particular methodology, protocols, and reagents, etc., described herein and as such may vary. The terminology used herein is for the purpose of describing particular embodiments only, and is not intended to limit the scope of the present invention, which is defined solely by the claims.

Any patents, patent applications, and publications including ASTM, JIS methods identified that are disclosed herein are expressly incorporated herein by reference for the purpose of describing and disclosing, for example, the methodologies described in such publications that can be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

We claim:

1. An electrodeposited copper foil comprising a drum side and a deposited side; wherein at least one of the deposited side and the drum side has a root mean square slope (RΔq) in the range of about 0.03 to about 0.23.

2. The electrodeposited copper foil of claim 1, wherein the root mean square slope (RΔq) is in a range of about 0.03 to about 0.19.

3. The electrodeposited copper foil of claim 1, comprising a hydrogen content of less than about 50 parts per million (ppm).

4. The electrodeposited copper foil of claim 3, wherein the hydrogen content is in the range of about 10 ppm to about 47 ppm.

5. The electrodeposited copper foil of claim 4, wherein the hydrogen content is in the range of about 10 ppm to about 40 ppm.

6. The electrodeposited copper foil of claim 3, wherein the electrodeposited copper foil has a fatigue life cycle/thickness in the range of about 10 $\mu m^{-1}$ to about 36 $\mu m^{-1}$.

7. The electrodeposited copper foil of claim 1, wherein each of the deposited side and the drum side has a root mean square slopes (RΔq) in the range of about 0.03 to about 0.23.

8. The electrodeposited copper foil of claim 7, comprising a hydrogen content of less than about 50 parts per million (ppm).

9. The electrodeposited copper foil of claim 8, wherein the hydrogen content is in the range of about 10 ppm to about 47 ppm.

10. The electrodeposited copper foil of claim 9, wherein the hydrogen content is in the range of about 10 ppm to about 40 ppm.

11. The electrodeposited copper foil of claim 8, wherein the electrodeposited copper foil has a fatigue life cycle/thickness in the range of about 10 $\mu m^{-1}$ to about 36 $\mu m^{-1}$.

12. The electrodeposited copper foil of claim 1, wherein the electrodeposited copper foil has a tensile strength in a range of about 25 to 75 $kg/mm^2$.

13. The electrodeposited copper foil of claim 1, wherein the electrodeposited copper foil has an elongation in a range of about 2 to 35%.

14. The electrodeposited copper foil of claim 1, wherein the electrodeposited copper foil has a thickness in the range of about 2 μm to about 25 μm.

15. A current collector for a lithium-ion secondary battery comprising the electrodeposited copper foil of claim 1.

16. A lithium-ion secondary battery comprising the current collector of claim 15.

17. The lithium-ion secondary battery of claim 16, wherein each of the deposited side and the drum side of the electrodeposited copper foil has a root mean square slopes (RΔq) in the range of about 0.03 to about 0.23.

18. The lithium-ion secondary battery of claim 17, wherein the electrodeposited copper has a hydrogen content of less than about 50 parts per million (ppm).

* * * * *